United States Patent Office 3,313,666
Patented Apr. 11, 1967

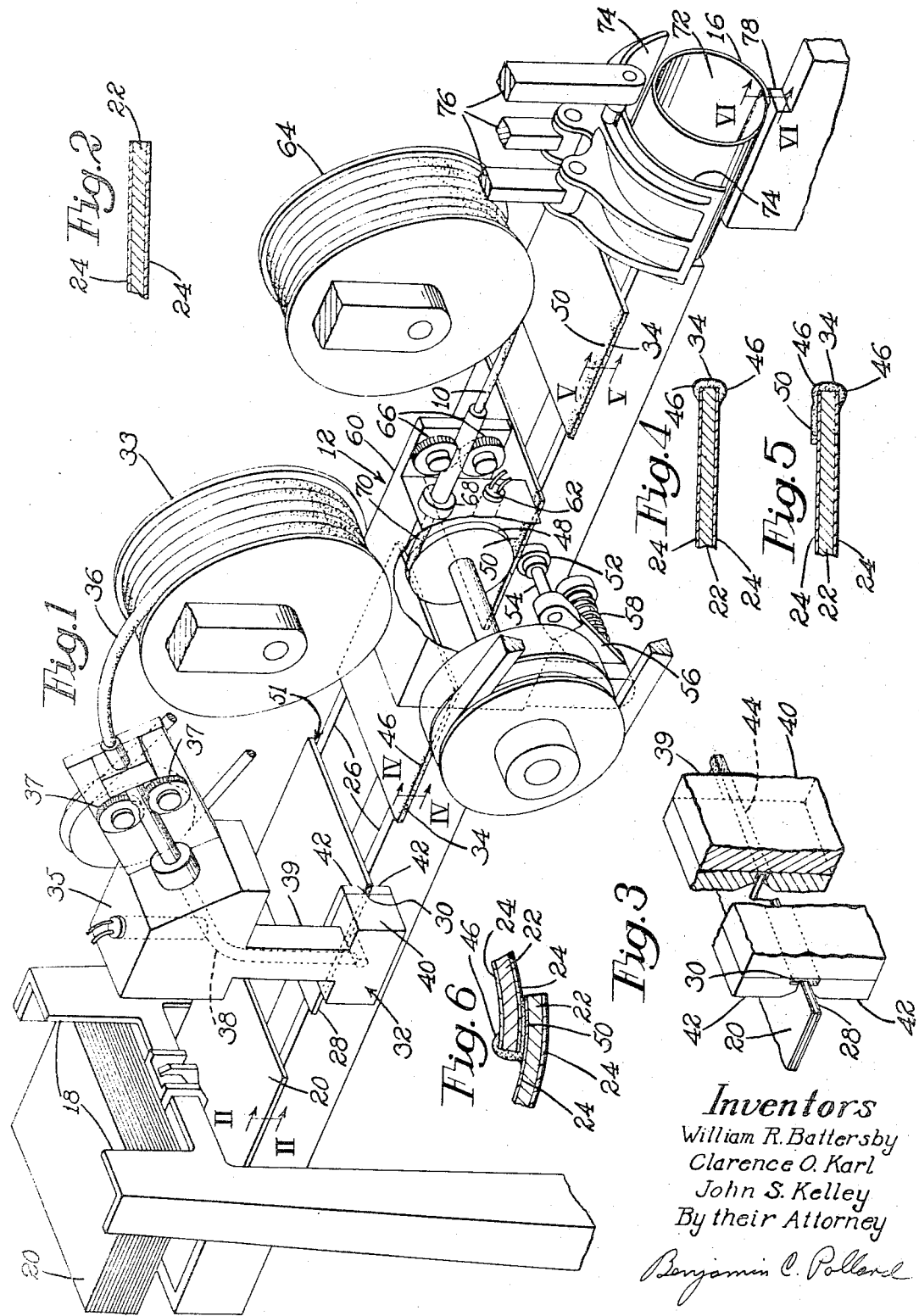

3,313,666
METHODS OF FORMING TUBULAR BODIES
William R. Battersby, Lexington, Mass., Clarence O. Karl, Hartford, Wis., and John S. Kelley, Wenham, Mass., assignors to United Shoe Machinery Corporation, Flemington, N.J., a corporation of New Jersey
Original application May 31, 1961, Ser. No. 113,912. Divided and this application Dec. 31, 1962, Ser. No. 248,488
4 Claims. (Cl. 156—218)

This application is a division of our prior copending application Ser. No. 113,912, filed May 31, 1961, entitled, "Tubular Bodies and Methods and Adhesives for Making Same," which is now abandoned.

This invention relates to an improved method of making a tubular body of fibrous sheet material.

Low cost metal foil lined containers for packaging liquid materials such as fruit juices have been made in which the tubular portion is formed by a cement seam between the overlapping marginal portions of a foil covered fiber sheet. Commercially acceptable rate of manufacture has been achieved through the use of a process involving a special hot melt adhesive bonding operation.

The resulting tubular container bodies though mechanically strong leave the edge of the fibrous sheet exposed at the edge of the interior of the overlapped marginal portions of the sheet. Various expedients have been proposed to protect this edge from "wicking" penetration by liquids. Stripes of lacquer have been applied at the seam to cover this edge and adjoining portions of the metal foil; and special fiber core sheets have been prepared in which the side edge, which is to be the inner of the overlapped edges, is completely incased in metal foil. In general, the procedures or devices employed to prevent "wicking" have been costly or time consuming or both.

It is an object of the present invention to provide an improved method of making a tubular body in which "wicking" difficulties are avoided.

To this end and in accordance with the feature of the present invention, there is provided a novel method of forming a tubular body involving the steps of applying edge sealing extending from surface layer to opposite surface layer around the exposed fiber at the inner of the overlapping edges of a tubular body to protect the edge fibers and forming a thermoplastic adhesive side seam cooperating with the edge sealant.

Sealing of the exposed fibers at the edge of the metal foil covered fibrous container blank is effected according to the present invention by depositing molten thermoplastic sealing material as a seal for the fiber cored sheet edge. The sealing material may extend from a marginal portion of the surface layer on one face of the sheet to a marginal portion of the surface layer on the opposite side of the sheet. Molten thermoplastic cement is deposited on the side seaming marginal portion of one surface layer. The side seaming margins are brought together in the side seaming operation to form a tubular body with both the side seaming cement and portions of the sealing material in soft deformable condition. Portions of the sealing material projecting above the level of the surface layer are flattened to conform to the surface layer against which they are pressed in the seaming operation. Thus, this sealing material not only does not interfere with close engagement of the surfaces to be joined but may actually improve the union.

Special polyethylene base thermoplastic adhesive and sealing materials are particularly effective in the method of forming a tubular body. In the adhesive, polyethylene, a rubbery isobutylene polymeric material and a hydrocarbon resin having limited solvent power towards polyethylene at elevated temperatures are combined with a copolymer of ethylene and vinyl acetate in special proportions. The combination of materials in these proportions gives a cooperative result insuring flow, wetting ability, open time and setting up characteristics giving superior operation in the high speed manufacture of tubular bodies and also giving strength and resistance to shock and flexing even at relatively low temperatures.

The edge sealer for cooperation with the polyethylene base thermoplastic adhesive in this relation is also preferably a polyethylene base composition. Where a separate sealer material is used, it may be adapted for special utility in sealing the fibrous edge. Suitably it will differ from the adhesive in that it will be less viscous in molten condition for more effective wetting and sealing of the edge of the covered fiber sheet and also more readily brought to softened condition by heat transferred to it by the side seaming cement. Thus, the edge sealer may be both softened by and combine with the molten deposited side seaming adhesive to form a continuous seal from the inner edge of the applied adhesive band around the edge of the surface layer and fiber portions of the blank and if desired around to the surface layer opposite the deposited adhesive.

The invention will be described further in connection with the drawings forming part of the disclosure in which:

FIG. 1 is an angular view, with parts broken away, of a container-forming device for practicing the method of the present invention in edge sealing, forming and bonding containers with thermoplastic material;

FIG. 2 is a cross sectional view on a somewhat enlarged scale taken on the line II—II of FIG. 1 of fiber sheet material with impervious cover layers for forming into containers according to the present invention;

FIG. 3 is a partial angular view, with parts broken away, and on a somewhat enlarged scale of the edge seal applicator member of the apparatus of FIG. 1 and showing the application of edge sealer to the edge of the covered fiber core sheet;

FIG. 4 is a sectional view taken on the line IV—IV of FIG. 1 and on a somewhat enlarged scale showing the edge sealing deposit on a side edge of a covered fiber core sheet;

FIG. 5 is a somewhat enlarged sectional view taken on the line V—V of FIG. 1 and showing the covered fiber sheet carrying both the edge sealer and the deposited adhesive with the sealer and adhesive intermingled at their points of engagement; and FIG. 6 is a somewhat enlarged sectional view taken on the line VI—VI of FIG. 1 and showing the adhesive joint and the edge seal at the side seam formed by overlapping portions of covered fiber core sheet.

A variety of thermoplastic adhesives and thermoplastic edge sealing compositions are useful in the method for forming a tubular body according to the present invention. Such adhesives may be compounded by chemists skilled in the art to provide the important combination of viscosity properties for use in the applicator of a tubular body forming machine, ability to wet the surfaces to be bonded and to remain in adhesive bond forming condition for the short but necessary period before completion of the seam; and rapid setting characteristics to avoid the requirement of long cooling periods after the parts of the seam are brought together. Adhesives useful in forming side seams are disclosed in the U.S. Patent to Eric C. Johnson et al., 2,912,398, Nov. 10, 1959 and Eric C. Johnson, 2,940,888, June 14, 1960.

Of the adhesives shown in these patents, each involves the inclusion of components which in solid state or in molten state tend to be incompatible. Where the edge sealer and side seaming adhesive are of the same composition, these adhesives may be entirely satisfactory. However, in a preferred form of the present invention, the edge sealer is applied to the edge as a separate operation preceding the application of the side seaming adhesive and is resoftened or retained in softened condition by sensible heat from the side seaming adhesive. It is preferred that contacting portions of the edge sealer and of the side seaming adhesive join smoothly.

An adhesive for use in combination with a polyethylene base edge sealer composition is ordinarily supplied as a thin rod or strand 10 of uniform cross section for use with a through feed softening and applying device 12 operating in time relation to other parts of the tubular body forming device 14.

The components of the adhesive are polyethylene, isobutylene polymeric material, a hydrocarbon resin having at elevated temperatures limited solvent action on the polyethylene and a copolymer of ethylene and vinyl acetate. In the special proportions used, the hydrocarbon resin provides an important compatibilizing action between the isobutylene polymeric material and the polyethylene material so that the isobutylene polymeric material may contribute to the consistency of the adhesive in molten condition and aid in holding the surfaces together prior to final setting up of the cement. The preferred copolymer of ethylene and vinyl acetate is a high molecular weight material and contributes an action comparable to that of the isobutylene polymeric material; but in addition it appears to have specific adhesiveness toward vinyl coated metal foil and gives an improved setting action and more aggressive adhesiveness which insures the formation of a more satisfactory and stronger union between the surfaces of the seam. Also the copolymer of the ethylene and vinyl acetate has extremely good compatibility with the polyethylene and improves the resistance of the adhesive seam to flexing and impact at low temperatures.

A preferred hydrocarbon resin is a polyterpene resin, and specifically a β-pinene polymer such as that sold under the trademark "Piccolite." This polymeric material is made in a wide range of melting points, the preferred polymers being those having a melting point of 85° to 125° C. This material exerts in molten form substantial solvent action on the polyethylene resin. Other hydrocarbon resins which possess substantial solvent action in molten condition include resinous polymerization products obtained by catalytic polymerization of mixed unsaturated monomers derived from cracked petroleum, and the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C.

The polyethylene component of the adhesive composition is a relatively high molecular weight of polyethylene, i.e., a resinous polyethylene as distinguished from a wax or grease. It is preferred to employ polyethylene materials having molecular weights in the range of from about 7,000 to about 21,000, but higher molecular weight polyethylene may be used. The molecular weights are determined by viscometric means using a solution of the polyethylene in tetralin at 130° C. and calculating the molecular weight by the following equation:

$$M = \frac{K_{cm} \log_{10} \pi_r}{C}$$

where M equals weight average molecular weight, $\pi_r$ equals relative viscosity, C equals base molar concentration of polymer in tetralin at temperature of determination equals 4.0 gms. per liter at 130° C. and $K_{cm}$ equals $4.03 \times 10^4$ gms. per liter of solution at 130° C. In the composition it appears that the polyethylene is fluxed and dissolved by the hydrocarbon resin and that by its presence in the hydrocarbon resin it controls the solvent power of the resin towards further dissolving ability towards polyethylene. In the solidified adhesive it appears also to serve as a reinforcing filler to reduce cold flow.

The isobutylene polymeric material may be a high molecular weight rubbery polyisobutylene, i.e., a material having a molecular weight of the order of about 100,000 or may be the material known as butyl rubber, that is, a sulphur vulcanizable rubbery copolymer of isobutylene and a diolefin, usually isoprene or butadiene, in approximately the proportions of 98 parts isobutylene to two parts of the diolefin. The isobutylene polymeric material gives a flexibility and resistance to cracking to the composition which is important to a rod adhesive of this nature for direct through-feed adhesive dispensing. In addition the isobutylene polymeric material cooperates in molten condition with the hydrocarbon resin to insure a viscosity and smoothness in the molten composition which enables a uniform deposit of adhesive on surfaces to be joined and controls the melting characteristics of the adhesive to give to the rod the property of progressive softening by heat to fluid activated condition in direct through feed adhesive dispensing. In a layer of adhesive deposited to form a joint between surfaces it contributes to desirable viscosity to aid in holding the surfaces together prior to final setting up of the adhesive.

Copolymers of ethylene and vinyl acetate useful in the present adhesive may have a molar ratio in the range of from 0.5 mol of ethylene to 1 mol of vinyl acetate to as high as 10 mols of ethylene to 1 mol of vinyl acetate. Preferred copolymer ratios are in the range of from 2 to 4 mols of ethylene to 1 mol of vinyl acetate and will have melting points of from about 90° to about 125° C. and melt viscosities as determined at 190° C. and a shear rate of 20 reciprocal seconds on the Castor-Severs Extrusion Rheometer of from about 150,000 to about 600,000 centipoises.

To achieve the desired combination of properties in the adhesive composition, it is found important to combine the foregoing materials in the proportions of about 15% to about 60% of polyethylene, preferably from 40% to 55%, from 10% to 35%, preferably 20% to 30% of the isobutylene polymeric material, from 20% to 60% of the hydrocarbon resin possessing in molten condition solvent action towards the polyethylene and from 10% to 40% of the copolymer of ethylene and vinyl acetate. It is possible to use mixtures of more than one hydrocarbon resin possessing the desired solvent characteristics and to use more than one type of or molecular weight of the polyethylene or of the isobutylene polymeric material. It is important in combining these materials to select components of sufficiently high molecular weight and melting point that the adhesive composition is substantially dry, that is substantially tack free and dimensionally stable at ordinary room temperatures.

Other materials may be added including antioxidants or substances which impart special properties such as very fine mineral fillers including calcium silicate, carbon blacks and the like.

Edge sealing composition useful with the above adhesive include resinous polyethylene base materials comprising at least about 15% by weight of resinous polyethylene. A preferred material is a combination of polyethylene, isobutylene polymeric material and a hydrocarbon resin having limited solvent action on the polyethylene at elevated temperatures. These materials are the same as certain of those defined above for use in the adhesive and will ordinarily be used in the proportion of 15% to 60% polyethylene, from 10% to 35% of the isobutylene polymeric material and from 20% to 60% of the hydrocarbon resin possessing in molten condition a solvent action toward the polyethylene.

An important use of the tubular bodies is for the cylindrical part 16 of liquid containers, such as fruit juice containers, and the invention will be described further in relation to making such container part. It is to be understood, however, that tubular bodies for other purposes may be made using the method of the invention.

A tubular container part forming device 14 useful for practicing the method and producing cylindrical container parts 16 comprises guides 18 in which are deposited blanks 20 to be formed in the device. As shown in FIG. 2, these blanks may comprise a core 22 of fiber board, paste board or similar fibrous sheet material having outer layers 24 of impervious material suitably metal foil, for example, aluminum foil secured on its opposite faces.

In blanks for forming fruit juice containers, the metal foil ordinarily is protectively coated as with a vinyl resin such as polyvinyl chloride deposited from volatile organic solvent solutions. Coatings of shellac and nitrocellulose are also used and bondable by the present adhesive. Union of the fiber board core 22 to the impervious layers 24 is not a part of the present invention, but it is understood that aluminum foil is secured to fiber board by means of polyvinyl acetate. The impervious layers 24 will be referred to hereinafter as "foil" but it is to be understood that the invention is not restricted to foil covered blanks. Blanks are slipped from the bottom of the pile to the slide ways 26 and are moved along the slide ways by conventional feeding mechanism, for example, a dog-type feed (not shown). It will be understood, of course, that where desired, the supply of laminated material for containers may be supplied from a continuous roll which may be cut into blanks 20 at any convenient stage. The blanks 20 are moved so that an edge portion 28 is passed through a slot 30 in an edge seal application device 32 for depositing the sealing material as a continuous body 34 extending (see FIG. 4) in a rounded contour from a marginal portion of the exposed face of the foil on one surface of the blank to a marginal portion of the exposed face of the foil 24 on the opposite side to form a seal extending around the cut edges of the foil 24 and fibrous core 22.

The applicator 32 comprises a sealing material supply device, illustrated as an electrically heated melting device 35 constructed to draw in a rod 36 of sealer material from reel 33, force it by feed rolls 37 into a channel 38 where it is melted to a fluid condition and delivered through the arm 39 to the applicator nozzle section 40. The applicator nozzle 40 comprises the spaced plate members 42 defining a slot 30 between their edges and being recessed to define with the arm 39 a tapering, suitably rectangular cross section channel 44. The edges 28 of successive blanks enter the slot 30 into contact with molten thermoplastic sealing material in the channel 44 and leave the slot 30 through the reduced section portion of the channel 38 which controls the amount of sealing material left on the edge 28 and adjacent portions of the opposite sides of the blanks 20. The sealing material forms a rounded bead of which side portions 46 may project beyond the levels of the opposite sides of the blank 20.

From the edge seal application device 32, the blanks 20 are moved so that a side seaming marginal portion passes under the exposed portion of an applying wheel 48 for deposition thereon of a band 50 of fluid thermoplastic adhesive. In the form illustrated, this band is deposited along the marginal portion adjacent the sealed edge for immediate cooperation with the edge seal material; but it may also be deposited along the marginal portion (indicated by an arrow numbered 51 in FIG. 1) adjacent the opposite edge and on the opposite side of the blank by appropriate modification of the applying device for cooperation with the edge seal material at the seam completing step. A pressure roll 52 for holding the blank 20 in firm contact with the applying wheel 48 is rotatably mounted on a shaft 54 carried on the end of an arm 56. Pressure on the wheel 52 to force the blank 20 into contact with the applying wheel 48 may be supplied by a spring 58.

The applying wheel 48 is a part of a melting and applying unit 12 comprising the block 60, and a heating element 62 in the block disposed to maintain the temperature at a value suitable for melting a rod 10 of thermoplastic adhesive and bringing it to application temperature. As shown thermoplastic adhesive in rod form 10 is withdrawn from the reel 64 by the opposing feed wheels 66 which introduce it through the entrance port 68 of the melting and applying unit 12. From the entrance port 68, the rod passes through a channel 70 in the heated metal block 60 where it is progressively softened and rendered fluid by contact with the heated surfaces of the channel 70 and the applying wheel 48. Molten adhesive carried by the surface of the applying wheel 48 is transferred as a band 50 on to the side seaming marginal portions of the surface of the blank 20 and in the form shown, also into contact with the portions 46 of the cooling material on the side of the blank. The molten thermoplastic adhesive softens and fuses to or blends with sealer material 34 with which it may come in contact to form a continuous body of resinous material extending around the edge 28 of the blank 20. The edge of the blank as it leaves the applying wheel 48 carrying the deposited adhesive band 50 and the softened sealer material is shown in FIG. 5. The container blank 20 with the hot fluid adhesive band 50 and the softened sealer material 34 thereon is moved to position above the forming horn 72 and is bent around the horn by reciprocating forming wings 74 which are carried and caused to function by supporting arms 76 which are actuated by suitable mechanism (not shown). The forming wings 74 are so operated that the edge 28 of the blank 20 carrying the sealer material 34 is bent in first and the side seaming marginal portion at the opposite edge of the blank is bent in thereafter in a manner to reduce the sliding of the coated edge 28 relative to the marginal portion at the opposite edge of the blank. When the blank 20 has been formed around the horn 72 with side seaming marginal portions overlapping and the sealed edge disposed interiorly, the bumping bar 78 is moved to the position shown in FIG. 1 to press the cemented edge portion of the blank firmly against the opposite edge portion of the blank to establish a bond between them and complete the seam. The formed and bonded cylindrical container body is then pushed off the horn and the cycle is repeated.

In the alternative adhesive band location referred to above, that is, along the marginal portion 51 of the blank 20, the hot adhesive may be brought into heat transfer relation with the edge sealer material 34 when the bumping bar 78 presses the overlapping side seaming marginal portions together to complete the seam. There also the edge sealer material 34 and the adhesive band 50 form a continuous body of thermoplastic material.

The following examples are given to aid in understanding the invention, but it is to be understood that the invention is not restricted to the details of temperature and procedure nor to the particular proportions or reagents in the examples:

EXAMPLE I

*Edge sealer composition*

|  | Parts |
|---|---|
| Polybeta-pinene (melting point 125° C.) | 30 |
| Copolymer of 98% isobutylene and 2% isoprene | 20 |
| Polyethlene (molecular weight 12,000) | 20 |
| Polyethylene (molecular weight 7,000) | 29 |
| Antioxidant | 1 |

The beta-pinene polymer resin was introduced into a Reed mixer and melted at a temperature of 169° C. The isobutylene-isoprene copolymer material was then added and mixed in, the temperature being lowered to 130° C. When the mixture was smooth, the temperature was raised to 150° C. and the polyethylene and antioxidant were added and mixed until the composition was smooth. The mixture was extruded as a ¼" thickness strand at a temperature of from 300° to 340° F. The extruded strand 36 was cooled in water and coiled as a reel 33 for use.

*Thermoplastic adhesive—Seaming adhesive*

| | Parts |
|---|---|
| Polybeta-pinene (melting point 115° C.) | 20 |
| Copolymer of 98 parts isobutylene and 2 parts isoprene | 20 |
| Polyethylene (molecular weight 12,000) | 20 |
| Polyethylene (molecular weight 20,000) | 19 |
| Copolymer of ethylene and vinyl acetate in molar ratio of 3 to 1 at 190° C. having a melt index of 15 as determined by A.S.T.M. test D–1238–52T and having a molecular weight of about 400,000 | 20 |
| Antioxidant | 1 |

The beta-pinene polymer, the isobutylene-isoprene copolymer and polyethylene components were mixed as in the preparation of the edge sealer and thereafter the ethylene vinyl acetate copolymer and antioxidant were added and the composition mixed until smooth. Thereafter, the mixture was extruded as a ¼" thickness strand at an extrusion temperature of from 325 to 375° F. The extruded strand 10 was cooled in water and coiled as a reel 64.

Using the container forming device described above, the strand 33 of edge sealer composition was introduced between the feeder rolls 37 and fed to the edge sealing, melting and application device 32 which supplied it in molten form through the channel 38 to the applicator nozzle 40. A temperature of about 375° to 425° F. was maintained in the edge seal application device 32.

The rod 10 of side seaming adhesive was supplied to the feeding rolls 66 and fed to the side seam melting and applying device 12 of the container forming device. The melting device 12 including the applying wheel 48 were maintained at a temperature of 450° to 500° F.

Container blanks 20 comprising a core of fiber board with coated aluminum foil sheets joined on their faces were placed in a pile against the guides 18 of the container forming device. The blanks 20 were slipped from the bottom of the pile to the slideways 26 and moved along the slideways in a manner to feed one edge 28 into the slot 30 in the edge sealer nozzle 40 for deposition of edge sealer material 34. As shown in FIG. 4, the deposited material formed a rounded contour bead along the edge of the blank from the marginal portion of one surface layer 24 over the cut edges of the surface layer 24 and fiber core 22 and over to the exposed face of the other surface layer 24 of the blank 20. After passing the nozzle, the blank 20 was moved forward so that the same edge passed under the applying wheel 48 for deposition of a band 50 of molten adhesive thereon. As shown in FIG. 5, the deposited band 50 of adhesive at least partially overlay the edge sealer material 34 on the marginal portion of the face of the blank, and the portion of the edge sealer with which it had come in contact and blended with it so that the adhesive and edge sealer formed a continuous body. The blank 20 with the band 50 of hot fluid adhesive and softened edge sealer 34 along one margin of the face then moved to position above the forming horn 72 and was bent around the horn 72 by the reciprocating forming wings 74. These forming wings operated so that the side of the blank having the soft thermoplastic material thereon was formed in first and the other side was then formed in to press the uncoated foil surface against the softened thermoplastic material. The bumping bar 78 was then moved to press the overlapping portions together to establish a bond between them. In the formed tubular container body, the interior edge portion 28 was protected against "wicking" by the edge sealer 34, and the edge sealer and side seaming cement formed a continuous body flattened against and in adhesive engagement with the surface of the side of the blank 20 which was pressed against the softened material. The formed and bonded container body was then pushed off the horn and the cycle is repeated. Thereafter the container body had a metal end crimped in sealing engagement on one end, was filled with fruit juice, and had a second metal end crimped to seal the remaining open end of the container.

EXAMPLE 2

*Side seaming adhesive formula*

| | Parts |
|---|---|
| Polybeta-pinene (melting point 115° C.) | 12.5 |
| Copolymer of 98 parts isobutylene and 2 parts isoprene | 25 |
| Polyethylene (molecular weight 12,000) | 37.5 |
| Copolymer of ethylene and vinyl acetate in molar ratio of 3 to 1 and Melt Index of 15 at 190° C. | 25 |

This formulation was prepared and formed into a rod according to the same procedure and was used in a container forming operation in the same manner as the adhesive in Example 1.

Having thus described our invention what we claim as new and desire to secure by Letters Patent of the United States is:

1. The method of forming a tubular body comprising the steps of applying polyethylene base thermoplastic resinous material in heat softened condition as a seal for a side seam interior edge of a fiber core sheet having impervious surface layers on its opposite faces, said resinous material comprising at least about 15% by weight of resinous polyethylene, and said applied resinous material extending in rounded contour from a marginal portion of one impervious layer to a marginal portion of the opposite impervious layer and covering fibrous core material at said edge, thereafter applying a band of a thermoplastic resinous adhesive in molten condition to a side seaming marginal portion of the exposed face of one of said impervious layers and into heat transfer contact with portions of the resinous seal along said edge, said thermoplastic resinous adhesive comprising a combination of resinous polyethylene, rubbery polyisobutylene polymeric material, a hydrocarbon resin having a softening point of at least about 85° C. and possessing in heated condition at least limited solvent power toward said resinous polyethylene and a copolymer of ethylene and vinyl acetate in the range of from about 0.5 to about 10 mols of ethylene to one mol of vinyl acetate, said copolymer having a melting point of from about 90° to about 125° C. and a melt viscosity at 190° C. and a shear rate of 20 reciprocal seconds of about 150,000 to 600,000 cps., said resinous seal and band forming a continuous body of thermoplastic material of which that part on said exposed face is in heat softened condition, forming said sheet into tubular configuration while said thermoplastic material remains in heat softened condition by bringing the side seaming marginal portions adjacent to said sealed edge into engagement with a second side seaming marginal portion of the exposed face of the impervious layer on the opposite side of and along the opposite edge of said sheet from said band and with the body of thermoplastic material interiorly of said opposite edge, pressing said second side seaming marginal portion of impervious layer against the heat softened thermoplastic material to secure conformity of said material with the surface of said layer and to establish an adhesive bond to hold said sheet in formed condition with the interior edge impervious to liquid penetration.

2. In the method of forming a tubular body from a fiber core sheet having impervious surface layers on its opposite faces comprising the steps of depositing a band of thermoplastic resinous adhesive in molten condition on a first side seaming marginal portion of the exposed face of one of said impervious layers, forming said sheet into tubular configuration with said adhesive band in adhesive contact with a second side seaming marginal portion along the opposite edge of said sheet while said adhesive is maintained in molten condition by the sensible heat of the adhesive deposited, pressing the side seaming marginal portions together with the adhesive between them and cooling said adhesive to form a strong side seam, the improvement comprising applying thermoplastic resinous adhesive in molten condition as a seal for the edge of said fiber core sheet which is to be the interior edge in said side seam, the adhesive of said seal extending around the fiber core at said edge from a marginal portion of the exposed face of one impervious layer to the exposed face of the opposite impervious layer, whereby molten side seaming adhesive of said band unites with and transfers sensible heat to the adhesive of said seal, and the resinous adhesive of said edge seal is in molten condition from the combination of its own sensible heat and heat transferred from the side seaming adhesive for conforming with side seaming marginal surface portions along the opposite edge of said sheet when said side seaming marginal portions are pressed together and said side seam adhesive and edge seal adhesive hold said sheet in formed condition with said interior edge impervious to liquid penetration.

3. In the method of forming a tubular body from a fiber core sheet having impervious surface layers on its opposite faces comprising the steps of depositing a band of thermoplastic resinous adhesive in molten condition on a first side seaming marginal portion of the exposed face of one of said impervious layers, forming said sheet into tubular configuration with said first side seaming marginal portions disposed interiorly of and with said adhesive band in adhesive contact with a second side seaming marginal portion along the opposite edge of said sheet while said adhesive is maintained in molten condition by the sensible heat of the adhesive deposited, pressing the side seaming marginal portions together with the adhesive between them and cooling said adhesive to form a strong side seam, the improvement comprising applying thermoplastic resinous adhesive in molten condition as a seal for the edge of said fiber core sheet which is to be the interior edge in said side seam, the adhesive of said seal extending in rounded contour around the fiber core at said edge from a marginal portion of the exposed face of one impervious layer to the exposed face of the opposite impervious layer, whereby molten side seaming adhesive of said band unites with and transfers sensible heat to the adhesive of said seal and the resinous adhesive of said edge seal is in heat-softened condition from the combination of its own sensible heat and heat transferred from the side seaming adhesive for conforming with side seaming marginal surface portions along the opposite edge of said sheet when said side seaming marginal portions are pressed together and said side seam adhesive and edge seal adhesive hold said sheet in formed condition with said interior edge impervious to liquid penetration.

4. In the method of forming a tubular body from a fiber core sheet having impervious surface layers on its opposite faces comprising the steps of depositing a band of thermoplastic resinous adhesive in molten condition on a first side seaming marginal portion of the exposed face of one of said impervious layers, forming said sheet into tubular configuration with said first side seaming marginal portion disposed interiorly of and with said adhesive band in adhesive contact with a second side seaming marginal portion along the opposite edge of said sheet while said adhesive is maintained in molten condition by the sensible heat of the adhesive deposited, pressing the side seaming marginal portions together with the adhesive between them and cooling said adhesive to form a strong side seam, the improvement comprising applying thermoplastic resinous adhesive in molten condition as a seal for the edge of said fiber core sheet which is to be the interior edge in said side seam, the adhesive of said seal extending in rounded contour around the fiber core at said edge from a marginal portion of the exposed face of one impervious layer to the exposed face of the opposite impervious layer, whereby molten side seaming adhesive of said band unites with and transfers sensible heat to the adhesive of said seal, and the resinous adhesive of said edge seal is in heat-softened condition from the combination of its own sensible heat and heat transferred from the side seaming adhesive for conforming with side seaming marginal surface portions along the opposite edge of said sheet when said side seaming marginal portions are pressed together and said side seam adhesive and edge seal adhesive hold said sheet in formed condition with said interior edge impervious to liquid penetration.

References Cited by the Examiner

UNITED STATES PATENTS

| | | | |
|---|---|---|---|
| 2,415,323 | 2/1947 | Wilcox | 229—3.1 |
| 2,775,395 | 12/1956 | Bergstrom | 229—3.1 |
| 2,940,888 | 6/1960 | Johnson | 156—218 |
| 2,975,150 | 3/1961 | Johnson et al. | 260—27 |

FOREIGN PATENTS 582,093　11/1946　Great Britain.

ALEXANDER WYMAN, *Primary Examiner.*

W. J. VANBALEN, *Assistant Examiner.*